(12) United States Patent  (10) Patent No.: US 7,914,595 B2
Nakamura et al.  (45) Date of Patent: Mar. 29, 2011

(54) FUME REMOVAL METHOD FOR A REFLOW FURNACE AND A REFLOW FURNACE

(75) Inventors: Hideki Nakamura, Koshigaya (JP); Tsutomu Hiyama, Tokyo (JP); Toshihiko Mutsuji, Souka (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 425 days.

(21) Appl. No.: 11/883,845

(22) PCT Filed: Feb. 6, 2006

(86) PCT No.: PCT/JP2006/301975
§ 371 (c)(1),
(2), (4) Date: May 1, 2008

(87) PCT Pub. No.: WO2006/082959
PCT Pub. Date: Aug. 10, 2006

(65) Prior Publication Data
US 2009/0282973 A1  Nov. 19, 2009

(30) Foreign Application Priority Data
Feb. 7, 2005 (JP) .................................. 2005-030031

(51) Int. Cl.
*B01D 50/00* (2006.01)
(52) U.S. Cl. ................ 55/320; 55/482; 55/486; 55/462; 55/465; 55/523; 55/440; 55/442; 55/443; 55/444; 95/268; 95/272; 95/273; 95/287
(58) Field of Classification Search .................... 55/320, 55/482, 486, 462, 465, 523; 95/268, 272, 95/273, 286, 287
See application file for complete search history.

(56) References Cited

U.S. PATENT DOCUMENTS

| 5,579,981 | A  | * | 12/1996 | Matsumura et al. | 228/19 |
| 5,611,476 | A  |   | 3/1997  | Soderlund et al. | 228/42 |
| 5,641,341 | A  |   | 6/1997  | Heller et al.    | 95/287 |
| 5,912,368 | A  | * | 6/1999  | Satarino et al.  | 55/320 |
| 6,193,774 | B1 | * | 2/2001  | Durdag et al.    | 55/385.6 |
| 6,382,500 | B1 |   | 5/2002  | Master et al.    | 228/180.1 |
| 6,576,030 | B2 | * | 6/2003  | Mullins          | 55/385.1 |
| 6,780,225 | B2 | * | 8/2004  | Shaw et al.      | 95/273 |
| 2003/0196551 | A1 | * | 10/2003 | Dautenhahn     | 95/273 |
| 2007/0039298 | A1 | * | 2/2007  | Tokumaru       | 55/523 |
| 2008/0295686 | A1 | * | 12/2008 | Neiderman et al. | 95/39 |

FOREIGN PATENT DOCUMENTS

| JP | 04 013475 |   | 1/1972 |
| JP | 54 41411  |   | 3/1979 |
| JP | 64 20964  |   | 2/1989 |
| JP | 02280808  | A * | 11/1990 |

(Continued)

*Primary Examiner* — Jason M Greene
*Assistant Examiner* — Dung Bui
(74) *Attorney, Agent, or Firm* — Michael Tobias

(57) ABSTRACT

In a conventional reflow furnace equipped with a fume removal device, fume solids adhere to the inside of piping connecting it to the removal device, and a great amount of trouble was required for removal of the fume solids. The present invention maintains a fumes-containing gas discharged from a furnace at a temperature of at least the liquefication temperature of the fumes until the gas reaches a removal device so that fume solids do not adhere to the inside of piping. A removal device installed on a reflow furnace according to the present invention comprises an elongated-hole filter and a labyrinth filter, and fumes are completely removed by both filters.

11 Claims, 3 Drawing Sheets

FOREIGN PATENT DOCUMENTS

| | | |
|---|---|---|
| JP | 04 013474 | 1/1992 |
| JP | 04 046667 | 2/1992 |
| JP | 04 251661 | 9/1992 |
| JP | 07 077346 | 3/1995 |
| JP | 07 212028 | 8/1995 |
| JP | 3050178 | 4/1998 |
| JP | 10 335807 | 12/1998 |
| JP | 2000 140502 | 5/2000 |
| JP | 2001 520462 | 10/2001 |

* cited by examiner

FUME REMOVAL METHOD FOR A REFLOW FURNACE AND A REFLOW FURNACE

TECHNICAL FIELD

This invention relates to a method of removing flux fumes which are generated in a furnace when soldering electronic parts to a printed circuit board to which a solder paste is applied and a reflow furnace equipped with a fume removal device.

BACKGROUND ART

Soldering in a reflow furnace generally employs solder paste. In soldering using a solder paste, first, the solder paste is applied to portions to be soldered of a printed circuit board with a printing device or dispenser, and electronic parts are placed on the portions where the paste was applied. The printed circuit board on which the electronic parts were placed is then heated in a reflow furnace to melt the solder paste and solder the printed circuit board and the electronic parts to each other.

A reflow furnace for soldering printed circuit boards is constituted by a preheating zone, a main heating zone, and a cooling zone. In order to carry out soldering, a printed circuit board to which a solder paste is applied is preheated by a heater in a preheating zone, it then undergoes main heating by a heater in the main heating zone, and it is cooled by a cooler in the cooling zone.

Solder paste is a viscous, pasty material obtained by mixing solder powder and a flux. Flux used in solder paste includes solid constituents such as rosin, an activator, and a thixotropic agent dissolved in a high boiling point solvent. Accordingly, when a printed circuit board to which a solder paste is applied is heated in a reflow furnace, it is first heated to 100-150° C. by a heater in the preheating zone, causing the solvent in the solder paste to evaporate and the solid constituents of the flux to melt. The molten solid constituents of the flux act to reduce and remove oxides adhering to the printed circuit board, thereby cleaning portions to be soldered. The printed circuit board is then heated to at least 200° C. by a heater in the main heating zone, and the solder powder melts and spreads over the cleaned portions to be soldered. After the molten solder has sufficiently spread over the portions to be soldered, it is cooled by a cooler in the cooling zone, and the molten solder is solidified to complete soldering.

Solder paste which is applied to a printed circuit board generates fumes by vaporization of solvent in the preheating zone. In addition, when solid constituents of the flux which melt in the preheating zone are exposed to a high temperature in the main heating zone, they become fumes. These fumes float inside the furnace. If these fumes of solvent and solid constituents contact components inside the furnace which are at a relatively low temperature, such as a conveyor which transports printed circuit boards inside the furnace, a fan which circulates hot air, a frame which forms the furnace, or labyrinths installed at the entrance and exit of the furnace, the fumes are cooled and condensed, and when the temperature further decreases, they become sticky solids. If a large amount of fumes which have become solids (referred to below as fume solids) adhere to components of the reflow furnace, they cause problems. Namely, if a large amount of fume solids adheres to a conveyor, printed circuit boards will adhere to the conveyor and will not separate from the conveyor when being transported out and will become entangled in the sprockets of the conveyor, resulting in damage to the printed circuit boards. If a large amount of fume solids adheres to a fan, the rotational speed of the fan will decrease and the strength with which air is blown will become weak. If a large amount of fumes solids adheres to a frame, the accumulated fume solids will drop onto printed circuit boards being transported and contaminate the printed circuit boards. Furthermore, if a large amount of fumes solids adheres to a labyrinth, the fume solids will contact printed circuit boards and cause electronic parts to drop off from prescribed locations.

In light of these problems resulting from adhesion of fume solids, from in the past, there have been many proposals of methods and apparatuses for removing fumes from inside a furnace (Patent Documents 1-8). A conventional reflow furnace with a fume removal mechanism had a fume removal device installed in a location separated from the furnace, and fume removal was carried out by lowering the temperature of fumes discharged by a pipe from the interior to the exterior of the furnace to as low a temperature as possible and condensing the fumes.

Patent Document 1: JP H04-13475 A1
Patent Document 2: JP H04-46667 A1
Patent Document 3: JP H04-251661 A1
Patent Document 4: JP H07-77346 A1
Patent Document 5: JP H07-212028 A1
Patent Document 6: JP H10-335807 A1
Patent Document 7: JP S54-41411 U1
Patent Document 8: JP S64-20964 U1

DISCLOSURE OF INVENTION

In a conventional reflow furnace equipped with a fume removal device, the fumes have been cooled by the time they reach the fume removal device, so a large amount of fumes adheres to the inside of pipes for discharging fumes from the furnace, and there were situations in which the pipes became clogged up with fume solids. If pipes became clogged up with fume solids, it was very troublesome to remove the fume solids. Doing so involves removing pipes connecting the reflow furnace and the fume removal device and cleaning the inside of the pipes. In order to remove the pipes, it is necessary to remove a large number of installation screws and to lower the heavy pipes. In addition, cleaning the inside of pipes requires immersion of the pipes in an organic solvent which can dissolve fume solids adhering to the inside of the pipes. However, fume solids cannot be completely removed just by immersion in an organic solvent, and it is necessary to perform the troublesome operation of scraping the inside of the pipes with a brush.

In addition, in a conventional reflow furnace equipped with a fume removal device, fume removal was sometimes inadequate, and when gases from which fumes were removed by the removal device were returned to inside the reflow furnace, the fumes condensed in low temperature portions inside the furnace, and problems like those described above occurred. The present invention provides a method and a reflow furnace equipped with a fume removal device which can not only prevent fume solids from adhering to discharge pipes but which can completely remove fumes formed inside a furnace.

The present inventors found that because the upper portion of a furnace is at a high temperature, if fumes are removed to the outside of the furnace from this region, fumes can be removed to outside the furnace while in a hot state, and if the fumes are passed through a long narrow passage, the fumes are cooled as they pass through the passage and condense on the walls of the passage. Furthermore, if the fumes are widely distributed and contacted with a plate, they are cooled by the entire plate. As a result, they completed the present invention.

The present invention is a fume removal method from a reflow furnace characterized in that the method comprises sucking a fumes-containing gas at a temperature of at least the liquefication temperature of the fumes from the vicinity of a heater installed in a reflow furnace, introducing the gas into a filter having a large number of elongated holes arranged side by side while maintaining the gas at a temperature of at least the liquefication temperature of the fumes, thereby cooling the fumes to condense it on the walls of the elongated holes and distributing the gas over a wide range by the large number of elongated holes, introducing the distributed gas which passed through the filter into a labyrinth filter having a large number of plates mounted on its top and bottom walls in a staggered arrangement to contact the gas with the plates of the filter, thereby cooling the fumes to condense on the plates and removing them from the gas, and then returning the gas from which fumes were removed to inside the furnace.

In another aspect, the present invention is a reflow furnace characterized by comprising a discharge port formed in an upper furnace wall (called a muffle) of the furnace and a fume removal device installed on the outside of the furnace in the vicinity of the discharge port, the discharge port being connected to an inlet of the removal device by a discharge pipe, the fume removal device being equipped with an elongated-hole filter having a large number of elongated holes disposed side by side and a labyrinth filter connecting to the elongated-hole filter and having a large number of plates mounted on its top and bottom walls in a staggered arrangement, the removal device having an outlet connected by a recirculation pipe to a recirculation port formed in a lower furnace wall of the furnace.

According to the present invention, fumes generated inside a furnace are discharged to the outside of the furnace at a temperature of at least the liquefication temperature of the fumes and are introduced into a fume removal device while being maintained at this temperature, so they do not condense in pipes connecting the discharge port of the furnace and the inlet of the removal device, and fume solids do not adhere to the interior of the pipes. Accordingly, the troublesome operation of removing pipes and scraping their interior with a brush becomes unnecessary in the present invention. In addition, in the present invention, high temperature fumes pass through a large number of elongated holes in the removal device, and the fumes are cooled while passing through the long passages of the holes such that they condense on the walls of the elongated holes and adhere thereto. Furthermore, in the present invention, fumes which are distributed over a wide area by the large number of elongated holes are then introduced into a labyrinth filter in which the fumes are further cooled, so the remaining fumes are condensed here and completely removed. Accordingly, in a reflow furnace according to the present invention, gas which passes through the removal device and is returned to the inside of the furnace contains almost no fumes, and fume solids do not adhere to interior components of the furnace at a low temperature, and problems due to fume solids do not occur.

Figure 1:
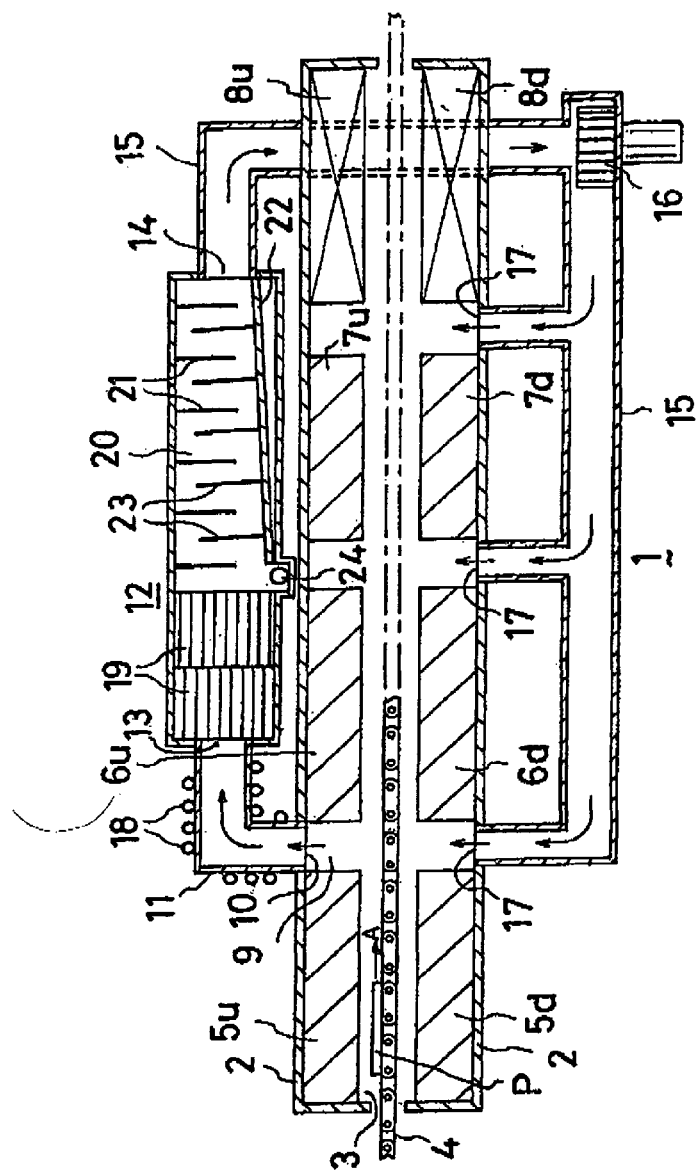
FIG. 1 is a front cross-sectional view of a reflow furnace according to the present invention.

LIST OF REFERENTIAL NUMERALS 1 reflow furnace
2 furnace wall
3 furnace
4 conveyor
5$u$, 5$d$, 6$u$, 6$d$ heaters for preheating
7$u$, 7$d$ heaters for main heating
11 discharge pipe
12 removal device
15 recirculation pipe
19 elongated-hole filter
20 labyrinth filter

BEST MODE FOR CARRYING OUT THE INVENTION

In general, the temperature at which fumes condense varies with the rosin used in solder paste. With rosin which is used in lead-free solder paste, the temperature at which fumes condense is at least approximately 150° C., and unless fumes are introduced into a fume removal device at this temperature or higher, they will condense inside pipes. In a conventional reflow furnace, the temperature of a fumes-containing gas discharged from a furnace decreased to below 150° C. by the time it reached a removal device, and fumes ended up condensing inside a discharge pipe. In a reflow furnace according to the present invention, a discharge port for discharging fumes from inside the furnace to the exterior of the furnace is formed in a furnace wall at the top of the furnace. Fumes having increased temperatures float upwards and they are easily discharged from the top position and are introduced into the removal device while being maintained at a high temperature. However, depending upon the type of rosin, there are cases in which the liquefication temperature of fumes is very high. In such cases, the temperature of the fumes is prevented from decreasing by wrapping a pipe which connects the discharge port of a furnace from which fumes are discharged to the inlet of a removal device with an electric heater.

Figure 2:
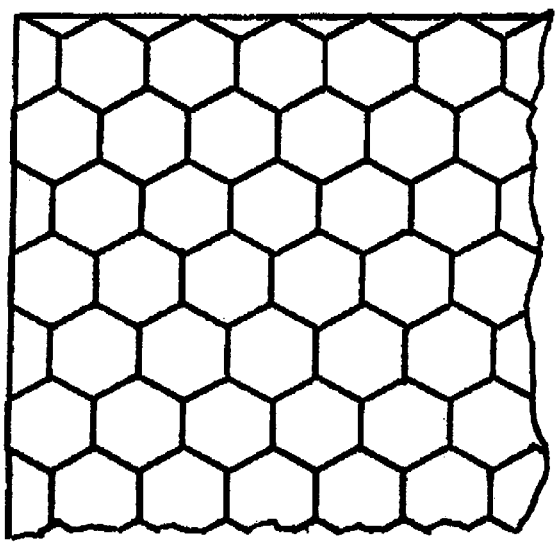
FIG. 2 shows a honeycomb-shaped elongated-hole filter used in a reflow furnace according to the present invention.
Figure 3:
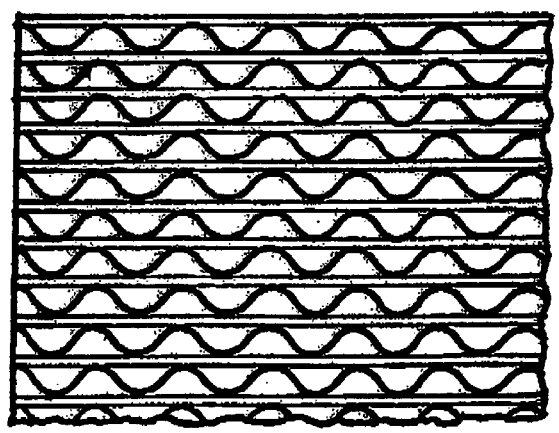
FIG. 3 shows a corrugated elongated-hole filter used in a reflow furnace according to the present invention.
Figure 4:
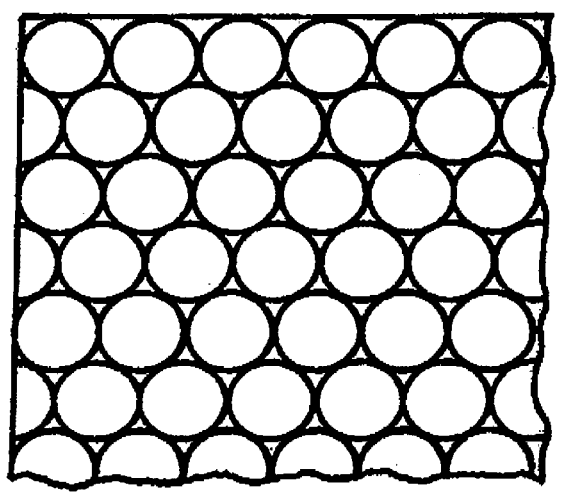
FIG. 4 shows a cylindrical elongated-hole filter used in a reflow furnace according to the present invention.

An elongated-hole filter used in a removal device for a reflow furnace according to the present invention may be one with a honeycomb structure in which hexagonal elongated holes are arranged side by side without gaps as shown in FIG. 2, one in which a large number of corrugated members are stacked to form wave-shaped holes as shown in FIG. 3, one in which a large number of cylinders are arranged side by side as shown by FIG. 4, or the like. A preferred elongated-hole filter used in the present invention is one having a honeycomb structure. If an elongated-hole filter has a honeycomb structure, the effect is obtained that even if condensed liquid permeates the filter and the filter becomes soft, the holes do not readily collapse. An elongated-hole filter used in the present invention can be made of any material, but paper is suitable. If the filter is made of paper, when fumes condense, since the liquefied fumes can seep into the paper, clogging of the holes does not occur easily. In addition, when a large amount of fumes have seeped into a paper filter and no more can seep into it, the filter can be simply discarded and replaced by a new filter.

A labyrinth filter in a removal device for a reflow furnace according to the present invention is one having a large number of plates suspended from its top wall and a large number of plates extending upwards from its bottom wall, with the upper (suspending) and lower (upwardly extending) plates being staggered with respect to each other. In a labyrinth filter, liquefied fumes can be easily recovered if a floor plate on which the upwardly extending plates are mounted is sloped. Namely, if the floor plate is sloping, when liquids in the fumes which condense on the plates drip down and reach the floor, they flow downwards in the direction of the slope of the floor plate and collect in one location. The liquids can be discharged to the exterior by a drain from the floor plate where they are accumulated.

Below, a reflow furnace according to the present invention will be explained based on the drawings. FIG. 1 is a front cross-sectional view of a reflow furnace according to the present invention.

The reflow furnace 1 is covered by a furnace wall 2, and a tunnel-shaped furnace 3 is formed in its interior. A conveyor 4 which supports a printed circuit board P and travels in the direction of arrow A is installed in the furnace 3. Heaters 5u, 5d, 6u, and 6d for preheating, heaters 7u and 7d for main heating, and coolers 8u and 8d are installed inside the furnace 3 above and below the conveyor 4. A gap 9 is formed between the heaters 5u and 6u for preheating installed in the upper portion of the furnace 3, and a discharge port 10 is formed in the gap through an upper furnace wall 2.

A discharge pipe 11 is connected to the discharge port 10. This discharge pipe is connected to the inlet 13 of a fume removal device 12. The outlet 14 of the fume removal device 12 is connected to a recirculation pipe 15, which extends downwards. A blower 16 is installed somewhere along the downwardly extending recirculation pipe 15, which then extends horizontally. The horizontally extending recirculation pipe 15 is connected to recirculation ports 17 formed in the bottom furnace wall 2. An electric heater 18 is wrapped around the discharge pipe 11. The electric heater 18 serves to heat the discharge pipe when a rosin having a high liquefication temperature is used in the flux of the solder paste, as is the case with a lead-free solder.

An elongated-hole filter 19 and a labyrinth filter 20 are installed inside the fume removal device 12. The elongated-hole filter 19 has a large number of elongated holes disposed side by side in the direction of flow. The elongated-hole filter has the shape of a block, and a plurality thereof are installed together. When condensed fumes seep into the elongated holes of the elongated-hole filter or fume solids accumulate, the entire block is replaced.

The labyrinth filter 20 is installed next to the elongated-hole filter 19 in the fume removal device 12. The labyrinth filter 20 has a large number of plates 21 suspended from the top and a large number of plates 23 extending upwards from a floor plate 22 on the bottom, with the upper plates 21 and the lower plates 23 being alternatingly disposed. The floor plate 22 is sloped in one direction, and a drain 24 is provided at the end of the slope.

Next, the operating state of a reflow furnace having the above-described structure will be explained. A printed circuit board P to which a solder paste is applied and on which electronic parts are positioned on the portions to which paste is applied is placed on the conveyor 4 and transported in the direction of arrow A. The printed circuit board is first heated to 100-150° C. by the preheating heaters 5u, 5d, 6u, and 6d installed in the upper and lower portions inside the furnace 3. At this time, solvents in the solder paste are vaporized to form fumes, and solid flux constituents of the solder paste are melted. Then, the printed circuit board is moved to a location between heaters 7u and 7d for main heating, and it is heated to 220-250° C. Here, solder powder in the solder paste are melted, and the molten solder powder spreads over the portions to be soldered. At the same time, solid flux constituents which were liquefied are exposed to a high temperature and become fumes. The fumes of solvents and the fumes of solid flux constituents float to the upper portion of the interior of the furnace 3.

By previously operating the blower 16 which is installed in the recirculation pipe 15, the gas inside the removal device 12 is sucked in the direction of the blower 16. Accordingly, the pressure inside the removal device 12 becomes a negative pressure, and gas inside the discharge pipe 11 connected to the inlet 13 of the removal device 12 is drawn into the removal device 12, and fumes-containing gas inside the furnace 2 connected to the discharge pipe 11 is drawn into the discharge pipe 11. Thus, fumes floating in the upper portion of the furnace 3 flow from the discharge port 10 through the discharge pipe 11 into the removal device 12. The fumes-containing gas which flows into the removal device 12 passes through the interior of the elongated holes in the elongated-hole filter 19, and as the gas passes through the long passages of the holes, it is cooled and condenses on the walls of the elongated holes. If the elongated-hole filter is made of paper, liquid from the condensed fumes seeps into the filter. Since the elongated-hole filter has a large number of holes, fumes-containing gas which flows into the removal device 12 from the discharge pipe 11 is distributed over a wide area and is discharged from the elongated-hole filter. However, the gas which is discharged from the elongated-hole filter 19 still contains fumes, and the remaining fumes are removed by the labyrinth filter 20.

The fumes-containing gas which flows out of the elongated-hole filter 19 and which is distributed over a wide area collides with the labyrinth-shaped plates 21, 23. At this time, the fumes-containing gas which collides with the plates is cooled by the plates and condenses on them. In this manner, fumes are removed as they pass between the large number of plates. The gas from which fumes are removed is sucked by the blower 16, passes through the recirculation pipe 15, and flows into the furnace 2 through the recirculation port 17 formed in the furnace wall 2.

When a large amount of condensed liquid from fumes adheres to the elongated-hole filter, the filter is replaced. Condensed liquid adhering to the plates 21, 23 of the labyrinth filter 20 drips from the plates and reaches the floor plate 22. Since the floor plate 22 is sloping, liquid atop the floor plate 22 flows downwards along the sloping floor plate 22 to the lower portion of the slope. A drain 24 is provided at the lower portion of the slope, and after liquid has accumulated at the lower portion of the slope, the drain is opened and the liquid flows to the exterior and is recovered.

In this embodiment of the present invention, the case was described in which a discharge port in a furnace wall of a furnace is formed in one location between heaters for preheating, but discharge ports can be formed in a plurality of locations, such as between heaters for preheating, between a heater for preheating and a heater for main heating, and between a heater for main heating and a cooler.

INDUSTRIAL APPLICABILITY

The present invention is suitable for a reflow furnace using solder paste, but it can also be employed when using materials other than solder paste which generate fumes when heated, such as adhesives and electrically conducting paste.

The invention claimed is:
1. A fume removal method for a reflow furnace comprising sucking a gas which contains fumes at a temperature of at least the liquefication temperature of the fumes from the vicinity of a heater installed in a reflow furnace, introducing the gas into a filter having a large number of elongated holes arranged side by side while maintaining the gas at a temperature of at least the liquefication temperature of the fumes, cooling the fumes to condense the fumes on the walls of the elongated holes and distribute the gas over a wide range by the large number of elongated holes, introducing the distributed gas into a labyrinth filter having a large number of upwardly-extending and downwardly-extending plates disposed in a staggered arrangement, contacting the gas with the plates to cool the fumes and condense the fumes on the plates to remove the fumes from the gas, and then returning the gas from which fumes were removed to inside the furnace.

2. A fume removal method as claimed in claim 1 wherein introducing the gas into the filter having a large number of elongated holes comprises passing the gas through a discharge pipe having an electric heater wrapped around it.

3. A method as claimed in claim 1 including heating the gas between the reflow furnace and an inlet of the filter having elongated holes.

4. A reflow furnace arrangement comprising a reflow furnace having a discharge port formed in an upper portion of the furnace and a recirculation port formed in a lower portion of the furnace, a fume removal device installed on the outside of the furnace in the vicinity of the discharge port, a discharge pipe connecting the discharge port and an inlet of the fume removal device, and a recirculation pipe connecting an outlet of the fume removal device to the recirculation port, the fume removal device including an elongated-hole filter having a large number of elongated holes disposed side by side and a labyrinth filter adjoining the elongated-hole filter on a downstream side of the elongated-hole filter and having a large number of upwardly-extending plates and downwardly-extending plates disposed in a staggered arrangement.

5. A reflow furnace arrangement as claimed in claim 4 wherein the elongated-hole filter has a honeycomb shape, a corrugated shape, or a cylindrical shape.

6. A reflow furnace arrangement as claimed in claim 4 wherein the labyrinth filter has a sloping floor plate on which the upwardly extending plates are mounted, and a drain which discharges liquid formed by condensation of fumes to the exterior installed in the vicinity of the lower end of the sloping floor plate.

7. A reflow furnace arrangement as claimed in claim 4 including an electric heater wrapped around the discharge pipe between the discharge port of the furnace and the inlet of the fume removal device.

8. A fume removal method for a reflow furnace comprising sucking a gas containing fumes from a reflow furnace, introducing the gas into an elongated-hole filter having elongated holes extending continuously between first and second ends of the elongated-hole filter, introducing gas which is discharged from the elongated-hole filter into a labyrinth filter having first plates extending from a first wall partway towards a second wall of the labyrinth filter and second plates staggered with respect to the first plates and extending from the second wall partway towards the first wall, and then returning gas which has passed through the labyrinth filter to an interior of the furnace.

9. A method as claimed in claim 8 including heating the gas between the reflow furnace and an inlet of the elongated-hole filter.

10. A reflow furnace arrangement comprising a reflow furnace having a discharge port and a recirculation port, a fume removal device installed on the outside of the furnace, a discharge pipe connecting the discharge port to an inlet of the fume removal device, and a recirculation pipe connecting an outlet of the fume removal device to the recirculation port, the fume removal device including an elongated-hole filter having a plurality of elongated holes extending continuously between an upstream end and a downstream end of the elongated-hole filter and a labyrinth filter connected to the downstream end of the elongated-hole filter and having first plates extending from a first wall partway towards a second wall of the labyrinth filter and second plates staggered with respect to the first plates and extending from the second wall partway towards the first wall.

11. A reflow furnace arrangement as claimed in claim 10 including a heater installed on the discharge pipe for heating gas passing through the discharge pipe.

* * * * *